United States Patent [19]
Brooks et al.

[11] Patent Number: 5,096,406
[45] Date of Patent: Mar. 17, 1992

[54] EXTRUDER ASSEMBLY FOR COMPOSITE MATERIALS

[75] Inventors: Joe G. Brooks, Springdale; Billy D. Goforth, Fayetteville; Charles L. Goforth, Lowell, all of Ark.

[73] Assignee: Advanced Environmental Recycling Technologies, Inc., Springdale, Ark.

[21] Appl. No.: 531,234

[22] Filed: May 31, 1990

Related U.S. Application Data

[63] Continuation-in-part of Ser. No. 491,061, Mar. 14, 1990.

[51] Int. Cl.⁵ .............................. B29B 7/32; B29B 7/90
[52] U.S. Cl. ...................................... 425/205; 366/81; 425/208; 425/382.3; 425/382.4; 425/199; 264/349
[58] Field of Search ...................... 425/131.1, 132, 197, 425/208, 377, 380, 202, 204, 205, 382.3, 382.4, 199; 264/108, 109, 122, 349; 366/81, 87

[56] References Cited

U.S. PATENT DOCUMENTS

| | | | |
|---|---|---|---|
| 826,442 | 7/1906 | Orr | 425/380 |
| 3,359,350 | 12/1967 | Godfrey | 264/108 |
| 3,493,031 | 2/1970 | Williams, Jr. et al. | 425/377 |
| 3,592,882 | 7/1971 | Morita | 264/108 |
| 4,854,847 | 8/1989 | Mendoza | 425/208 |

*Primary Examiner*—Jeffery Thurlow
*Assistant Examiner*—Mathieu Vargot
*Attorney, Agent, or Firm*—Ross, Howison, Clapp & Korn

[57] ABSTRACT

An extruder assembly for composite materials, the extruder assembly having a barrrel with feed and compression sections, a rotatable screw adapted to convey a composite material through the barrel, at least one fiber alignment means, and a die. The screw diameter in the feed section is approximately twice the screw diameter in the compression section, and the flight spacing in the feed section is approximately twice the flight spacing in the compression section.

1 Claim, 2 Drawing Sheets

EXTRUDER ASSEMBLY FOR COMPOSITE MATERIALS

CROSS REFERENCE TO RELATED APPLICATION

This application is continuation-in-part of U.S. patent application Ser. No. 07/491,061, filed Mar. 14, 1990, still pending.

TECHNICAL FIELD

This invention relates to extruders, and more particularly, to a screw-type extruder specially adapted for extruding composite materials comprising a discontinuous phase of elongated wood fibers or other fibrous cellulosic material dispersed in a continuous phase of a polymeric material such as polyethylene.

BACKGROUND OF THE INVENTION

Although screw-type extruders useful for extruding polymeric materials are well known, problems are encountered in trying to extrude composite materials comprising significant amounts of wood fibers in combination with a polymeric resin in conventional extruders. Such problems include, for example, high shear rates which can increase temperatures and cause fiber breakage. High temperatures can reduce polymer viscosity below the level needed to produce a uniform product with good fiber dispersion, and can cause charring of the wood fiber. Fiber breakage can adversely affect fiber alignment and the physical properties of the extrudate.

An extruder is therefore needed that is specially adapted for extruding such composite materials.

SUMMARY OF THE INVENTION

According to the present invention, an extruder assembly is provided that is specially adapted for use in extruding composite materials comprising cellulosic fibers, primarily wood fibers, substantially evenly distributed throughout a continuous polymeric phase.

According to a preferred embodiment of the invention, the subject extruder assembly comprises a screw-type extruder having a feed section and a compression section. The diameter of the barrel bore in the feed section is approximately double the diameter of the barrel bore in the compression section. A single screw having a substantially constant shaft diameter extends through both the feed and compression sections. The difference between the outer diameter of the screw flights and the shaft diameter is preferably three to four times greater in the feed section than in the compression section, and the longitudinal spacing of the screw flights in the feed section is preferably about twice the spacing of the screw flights in the compression section.

According to another preferred embodiment of the invention, the subject extruder assembly comprises at least one fiber alignment plate adapted to substantially align wood fibers dispersed throughout the polymeric phase in the flow direction without causing plugging or significant fiber breakage.

According to another preferred embodiment of the invention, an extruder assembly for composite materials is provided, the extruder assembly comprising a barrel with feed and compression sections, a rotatable screw adapted to convey a composite material through the barrel, at least one fiber alignment means, and a die. The screw diameter in the feed section is approximately twice the screw diameter in the compression section, and the flight spacing in the feed section is approximately twice the flight spacing in the compression section.

BRIEF DESCRIPTION OF THE DRAWINGS

The apparatus of the invention is further described and explained in relation to the following figures of the drawings, wherein.

Like reference numerals are used to indicate like parts in all figures of the drawings.

DETAILED DESCRIPTION OF THE PREFERRED EMBODIMENTS

Figure 1:
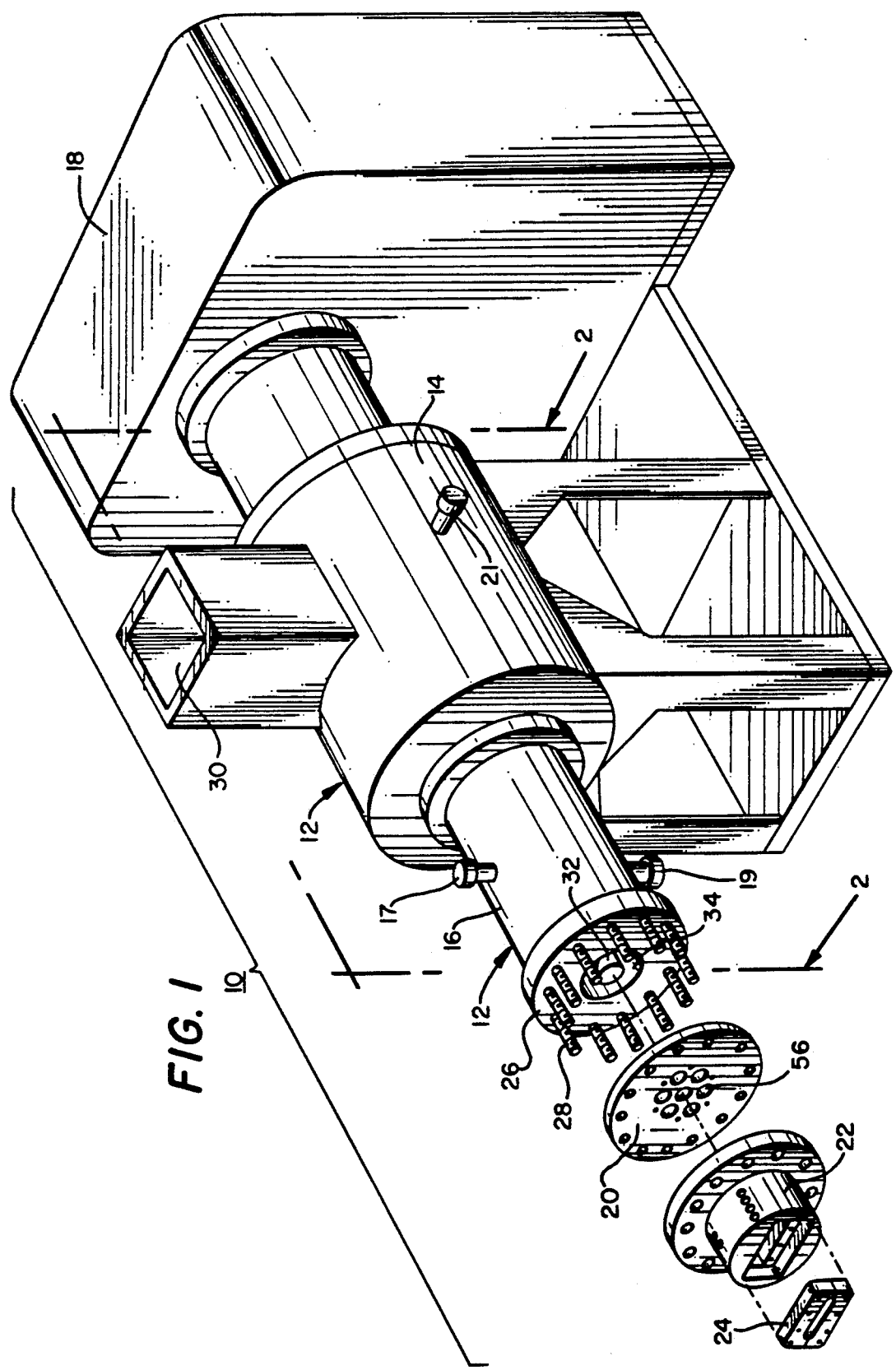
FIG. 1 is a partially exploded, simplified perspective view depicting a preferred composite material extruder assembly of the invention.

Referring to FIG. 1, extruder assembly 10 preferably comprises extruder 12 further comprising feed section 14, compression section 16, drive means 18, fiber alignment plate 20, bolster 22, die 24, outlet flange 26, lugs 28, feed inlet 30, and rotatable screw 32. Extruder 12 is preferably jacketed and provided with means for circulating a fluid around the barrel of feed section 14 and compression section 16 for use in controlling the temperature of the extruder as needed. Inlets 17, 21 and outlet 19 are fittings adapted for connection to external fluid circulatory means (not shown).

Fiber alignment plate 20, bolster 22 and die 24 are depicted in exploded relation in FIG. 1, but is understood that die 24 is bolted into bolster 22 and that bolster 22 and fiber alignment plate 20 are to be bolted onto outlet flange 26 by means of lugs 28 and nuts (not shown) prior to operating extruder assembly 10. Bolster 22 holds and supports interchangeable dies such as die 24 for the extrusion of desired products having different profiles or configurations.

Figure 2:
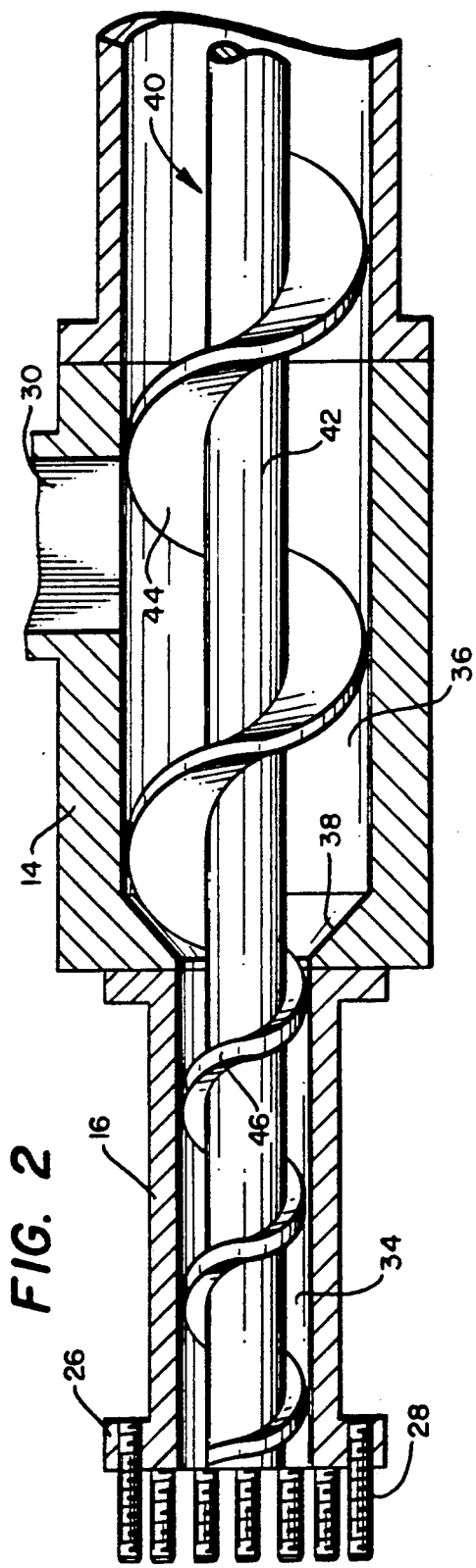
FIG. 2 is a simplified partial cross-sectional elevation view of the feed and compression sections of the extruder assembly as viewed along line 2—2 of FIG. 1.

FIG. 2 provides a partial cross-sectional view of feed section 14 and compression section 16 of extruder 12. For simplicity of illustration, inlet 17 and outlet 19, as well as the associated flow channels through the jacket of the extruder, are not shown in FIG. 2. Likewise, the upper portion of feed inlet 30 is not shown. Referring to FIG. 2, feed section 14 further comprises internal bore section 36 having disposed therein a portion of rotatable screw 40 comprising shaft 42 and feed section flights 44. Compression section 16 further comprises internal bore section 34 having disposed therein a portion of rotatable screw 40 comprising shaft 42 and compression section flights 46.

Tapered bore section 38 is preferably provided between internal bore sections 34, 36 and establishes a gradual transition therebetween. Feed section flight 44 likewise tapers into compression section flight 46 in the tapered bore section 38 to assure substantially uniform clearance between the screw flights and the bore throughout feed section 14 and compression section 16.

According to a preferred embodiment of the invention, the diameter of internal bore section 36 of feed section 14 is approximately twice the diameter of internal bore section 34 of compression section 16. Also, the combined length of internal bore section 36 and tapered bore section 38 from feed inlet 30 to the downstream end of tapered bore section 38 within feed section 14 is preferably about the same as the length of internal bore section 34 within compression section 34.

The lead or longitudinal spacing of flights 44 in internal bore section 36 is preferably about twice that of flights 46 in internal bore section 34. The thickness of flights 44 and 46 is preferably about the same.

According to a preferred embodiment of the invention, the diameter of shaft portion 42 of screw 40 is substantially constant over its length, meaning that the radial distance between the outermost edge of flights 46 and shaft 42 is substantially less than the radial distance between the outermost edge of flights 44 and shaft 42. The difference between the flight diameter and the shaft diameter in the feed section is preferably from about 3 to about 4 times greater than the difference between the flight diameter and the shaft diameter in the compression section of extruder 12.

According to a particularly preferred embodiment of the invention, wherein extruder assembly 10 is adapted to process from about 1000 to about 2500 pounds per hour of composite material, the diameter of internal bore section 36 is about 12 inches; the diameter of internal bore section 34 is about 6 inches; the length of feed section 14 is about 27 inches; the length of compression section 16 is about 30 inches; the difference between the diameter of flights 44 and the diameter of shaft 42 is about 6½ inches; the difference between the diameter of flights 46 and the diameter of shaft 42 is about 2 inches; and the thickness of flights 44, 46 is about ¾ inch.

When constructed as described above, extruder assembly 10 is particularly useful for extruding composite materials comprising elongated wood fibers dispersed throughout a continuous polymeric phase into a uniform profile in which the fibers are substantially aligned in the flow direction.

Figure 4:
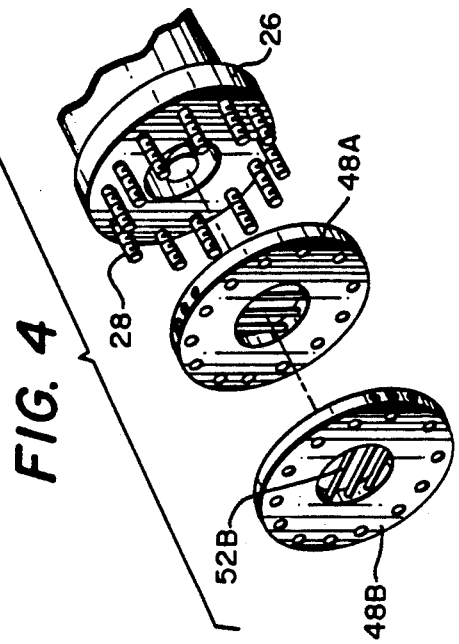
FIG. 4 is an exploded perspective view depicting two fiber alignment plates as shown in FIG. 3 as they would be installed on the outlet flange of the extruder.
Figure 3:
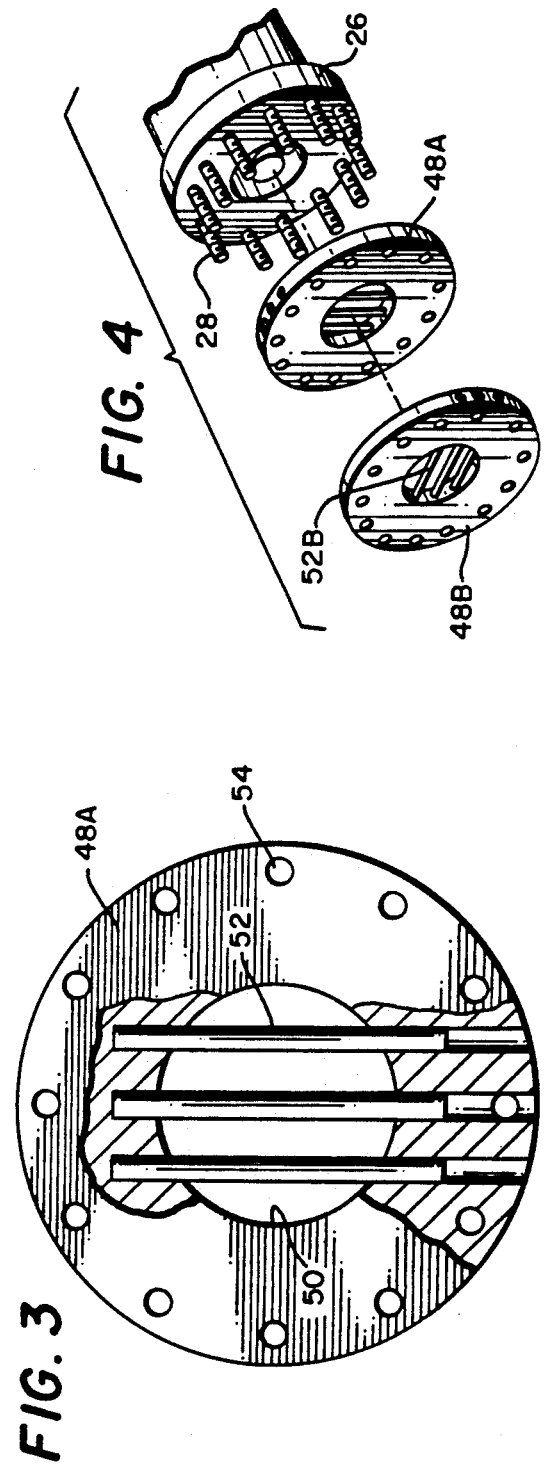
FIG. 3 is a front elevation view of a preferred fiber alignment plate suitable for use in the extruder assembly of the invention.

Referring to FIG. 3, another particularly preferred fiber alignment plate 48A is disclosed which comprises internal bore 50 and a plurality of parallel bars 52 traversing the bore. According to one preferred embodiment of the invention, as shown in FIG. 4, a plurality of such fiber alignment plates 48A, 48B are provided for attachment to lugs 28 of outlet flange 26. The orientation of bars 52B in plate 48B is preferably rotated relative to bars 52 of plate 48A to promote alignment of the elongated fibers in the extrudate. Bars 52 as shown in fiber alignment plate 48 are an alternative to orifices 56 in fiber alignment plate 20 as shown in FIG. 1. It is understood, however, that both plates 20 and 48 are merely illustrative of means that can be used upstream of die 24 to assist in aligning fibers within a composite material in the flow direction.

Other alterations and modifications of the subject invention will become apparent to those of ordinary skill in the art upon reading the present disclosure, and the inventors intend that the scope of the invention be limited only by the broadest interpretation of the appended claims to which they are legally entitled.

What is claimed is:

1. An extruder assembly adapted for use in extruding composite material comprising elongate cellulosic fibers dispersed in a continuous polymeric phase, said extruder assembly comprising a feed section; a compression section; an internal bore in said feed section having a first diameter; an internal bore in said compression section having a second diameter, said first bore diameter being about twice said second bore diameter; a tapered internal bore section extending between said feed section and said compression section; and a rotatable screw having a shaft portion coaxially mounted within said internal bores; said shaft having a continuous flight extending longitudinally through said feed and compression sections and a diameter less than the diameter of said flight; said flight having a first diameter within said feed section and a second diameter within said compression section, the difference between the first flight diameter and the shaft diameter within said feed section being from about three to about four times the difference between the second flight diameter and the shaft diameter within said compression section; said flight having a lead within said feed section that is about twice the lead of said flight within said compression section.

* * * * *